United States Patent [19]

McEvoy

[11] Patent Number: 5,746,555
[45] Date of Patent: May 5, 1998

[54] CONNECTOR WITH ENGAGEMENT INDICATOR

[76] Inventor: William Richard McEvoy, 3705 Kingridge Dr., San Mateo, Calif. 94403

[21] Appl. No.: 597,219

[22] Filed: Feb. 6, 1996

[51] Int. Cl.[6] .................. F16B 31/02; F16D 1/02
[52] U.S. Cl. .................................. 411/14; 403/307
[58] Field of Search ..................... 411/8, 9, 13, 14; 403/27, 299, 305, 307; 285/93

[56] References Cited

U.S. PATENT DOCUMENTS

| 1,035,816 | 8/1912 | Allen . | |
|---|---|---|---|
| 1,326,008 | 12/1919 | Tarbox . | |
| 1,415,658 | 5/1922 | Lane . | |
| 2,577,167 | 12/1951 | Vlasis | 223/25 |
| 2,679,414 | 5/1954 | Hornschuch | 403/307 |
| 4,017,198 | 4/1977 | Mason | 403/43 |
| 5,082,406 | 1/1992 | Cosenza | 411/14 |

OTHER PUBLICATIONS

Dayton Superior: Dowel Bar Replacement, 1983 Ed."D-50 DBR Coupler and DBR Setting-Splice Bars", p. 3.

*Primary Examiner*—Steven N. Meyers
*Assistant Examiner*—Robert G. Santos
*Attorney, Agent, or Firm*—Thomas C. Feix

[57] ABSTRACT

A coupler for connecting two axially aligned, rod-like reinforcing members or structural parts and which permits a visual confirmation that successful coupling of the two structural parts has been made. The coupler is fashioned as a sleeve with two opposed open ends, each open end for receivingly engaging a corresponding inserted end of one of the structural parts. The sleeve includes at least one inspection hole or through-hole disposed medial of the sleeve ends. The sleeve further includes a displaceable inspection element disposed inserted within the through-hole and a stop member for limiting the engagement depth of the structural parts within the respective open ends of the sleeve. The inserted structural parts engage the displaceble inspection element and forcibly cause it to displace outwardly of the through-hole and thereby provide a visual confirmation that the two structural parts have been successfully coupled with a desired engagement depth. The displaceable inspection element preferably consists of flowable material which facilitates displacement outwardly through the inspection hole under subjected to compressive forces. Alternate embodiments disclose internally threaded and swage fit sleeve assemblies provided with two, co-aligned inspection holes. A further alternate embodiment discloses a structural tension connector for single sided coupler installations consisting of a sleeve mated to a wall mountable base plate portion.

5 Claims, 3 Drawing Sheets

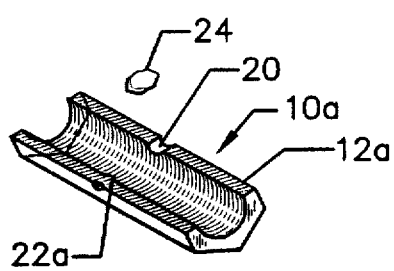
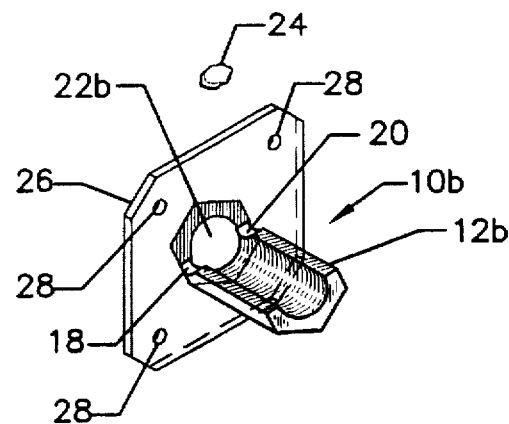
Figure 5
Figure 6
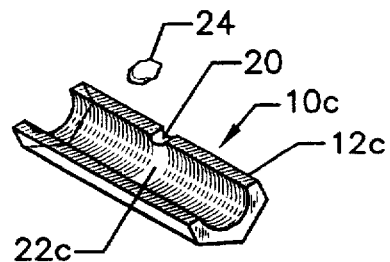
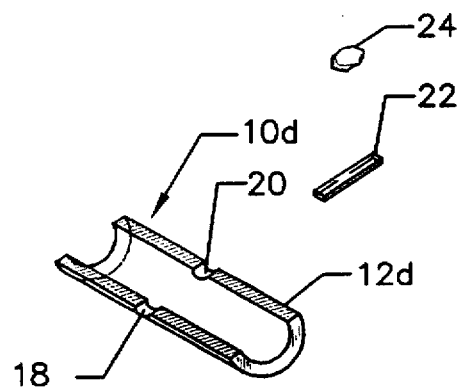
Figure 7
Figure 8

CONNECTOR WITH ENGAGEMENT INDICATOR

TECHNICAL FIELD

The present invention relates to structural connectors, and in particular, the invention relates to a method and apparatus for coupling two axially aligned structural members which utilizes a sleeve as a coupling member in a way that permits a visual confirmation that a successful coupling with desired engagement has been made.

BACKGROUND OF THE INVENTION

The current state of the art in building construction for making structural tension connections, such as, for example, earthquake tie downs, involves special inspection to confirm the proper engagement of the various parts of the connection assembly. Such special inspection is beyond the scope of the usual inspections performed in buildings made of light wood construction, such as, for example, the typical single family home built in California.

One type of known structural tension connector that is widely used in the construction industry is the reinforced concrete connector that is used for splicing together sections of steel concrete reinforcement bar (known in the trade parlance as "rebar") using a threaded sleeve connector. An exemplary coupling for concrete reinforcement bar is disclosed in U.S. Pat. No. 5,152,118 issued to Lancelot.

A standard method of assuring proper engagement in structural tension connections of the type described, involves marking the structural parts with paint or chalk to indicate a desired engagement depth on each structural part within the sleeve coupler.

When properly installed, the mark will still be visible after the structural parts and coupler sleeve are assembled to complete the connection. This requires that the structural parts be inspected prior to assembly to verify the location of their respective marks. A second inspection is then required after assembly to verify that the marks are at the proper distance from the sleeve coupler.

In practical use, the current state of the art in threaded rod or bar connectors is much too cumbersome for widespread use in most light wood home construction. In regions of the country where seismic activity is common place, eg., California, it is desirable, and usually required by local building codes, to employ some form of earthquake tie down or restraint means for firmly anchoring a house to its foundation.

In the particular case of earthquake tie downs used for light wood home construction, it would be desirable to modify the typical threaded rod connector of the prior art to include a displaceable inspection element which, upon assembly of the structural members within the sleeve, would provide a visual confirmation that a successful coupling of the two structural members has been made. It would further be desirable that the modified coupler eliminate the need for the first inspection of the structural members prior to assembly.

Electrical connectors are known from the prior art, which include connector bodies or housings having some type of fitting indicating mechanism that provides a visual confirmation of coupling completeness upon assembly of all the connector components. See, for example, U.S. Pat. Nos. 5,336,104 issued to Nagamine and 4,629,351 issued to Kato et al.

The fitting indicating function in such prior art electrical connectors is typically performed by causing one solid part of the connector device to extend out through or into an opening disposed in the connector housing as the parts are connected together. As is readily apparent to those having ordinary skill in the art, such electrical connectors, being fabricated largely from plastic parts, are unsuitable for use in making heavy duty structural tension connections where connection strength, firm engagement and resistance to shearing forces are critical factors. Also, the visual indicating mechanisms associated with such electrical connectors would be very complex to manufacture and would be too costly and difficult to implement in conventional structural tension connector designs.

Accordingly, there is a definite need in the art for a structural connector which includes simple, low cost engagement indicating means that allows for a quick visual confirmation that a successful coupling with proper engagement of two structural members has been made.

SUMMARY OF THE INVENTION

It is therefore an object of the present invention to present a connector for structural members that includes a displaceable inspection element which, upon assembly of the structural parts of the connector, allows the operator to visually confirm that a desired firm engagement of the structural parts within the connector has been successfully made without the need for marking and inspecting the structural parts prior assembly.

Briefly, in accordance with a preferred embodiment of the invention, the connector is sleeve-like in configuration and includes a sleeve wall having at least one through-hole disposed therein. The through-hole is located approximately midway between the two open ends of the sleeve and is sized to receive and/or permit inspection of a displaceable inspection element. Upon insertion of the two structural members in the respective open ends of the sleeve connector, the inspection element is forceably displaced outwardly of the through-hole. In one embodiment, the displaceable inspection element comprises flowable material, such as plastic or adhesive.

For ease in manufacture and for use in firmly securing the displaceable inspection element within the sleeve connector, the sleeve connector may optionally be provided with a second through-hole in its sleeve wall, whereby the second through-hole is arranged in co-alignment with the first through-hole, and whereby the axis of the co-aligned through-holes is oriented transverse to the longitudinal direction of the sleeve body.

The sleeve connector of the present invention may be adapted for use in a wide variety of common connection applications, including reinforcing bar connections and swage-fit connections. The sleeve connector of the present invention may also be adapted for use in single-sided connector installations.

The simplicity and low cost nature of the sleeve connector with engagement indicator of the present invention advantageously facilitates compliance with proper installation practices. Also, since the connector of the present invention is expected to be used as part of the installation of seismic restraints and hold downs, it has the potential to increase the proper installation of these devices thus reducing risk to public safety in buildings.

A further advantage of the present invention is that the connector has a very high degree of reliability. Factory tolerance in locating the placement of the displaceable inspections element within the sleeve can be much better than the tolerance achieved when a construction worker measures with a tape and, using chalk or paint, marks the engagement depth on the structural members to be coupled by the sleeve connector.

Further still, inspection time is considerably reduced. In fact, the present invention can make the difference between good inspection and no inspection at all.

A further advantage of the present invention is that the proper engagement of the structural elements within the sleeve connector can be visually verified at any time after installation, assuming, of course, that the connector is still visible.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 5 is a fragmentary perspective view showing a first alternate embodiment of the present invention.

FIG. 6 is a fragmentary perspective view showing a second alternate embodiment of the present invention.

FIG. 7 is a fragmentary perspective view showing a third alternate embodiment of the present invention.

FIG. 8 is a fragmentary perspective view showing a fourth alternate embodiment of the present invention.

DETAILED DESCRIPTION OF THE PREFERRED EMBODIMENTS

Figure 1:
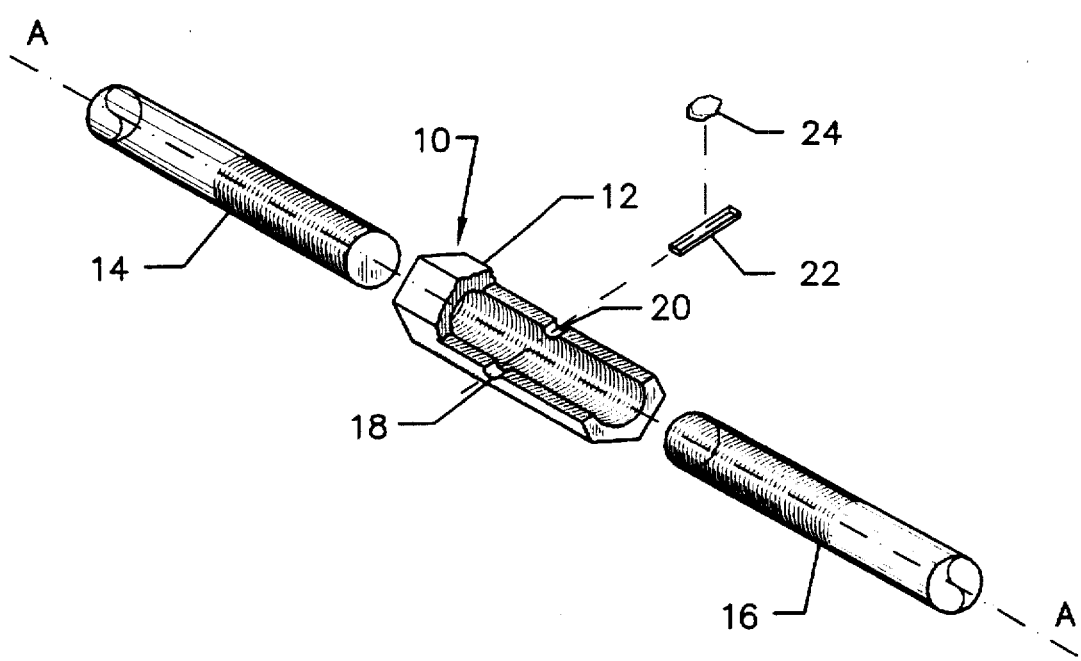
FIG. 1 is a perspective view of a sleeve coupler with engagement indicator constructed in accordance with one embodiment of the present invention and also showing (in exploded view) two structural parts or reinforcing members that are to be connected by the sleeve coupler.

A structural tension connector with engagement indicator constructed in accordance with one embodiment of the present invention is designated generally by reference numeral 10 in FIG. 1.

The connector 10 includes a coupler body portion or sleeve 12. In the embodiment shown, the sleeve 12 is internally threaded and is adapted for receivingly engaging the corresponding threaded portions of structural parts 14 and 16.

The sleeve 12 is provided with at least one inspection port or through-hole in the sleeve wall located approximately midway between the two open ends of the sleeve 12. In the embodiment shown, the sleeve 12 includes two co-aligned through-holes 18 and 20.

The axis of the co-aligned through-holes 18 and 20 is oriented transverse to the longitudinal axis A—A of the sleeve 12. A stop member 22 is located adjacent the co-aligned through-holes 18 and 20 and is operative to limit the engagement depth of the structural parts 14 and 16 within the respective open ends of the sleeve 12. Also, a displaceable inspection element 24 is received within the through-holes 18 and 20.

Figure 2:
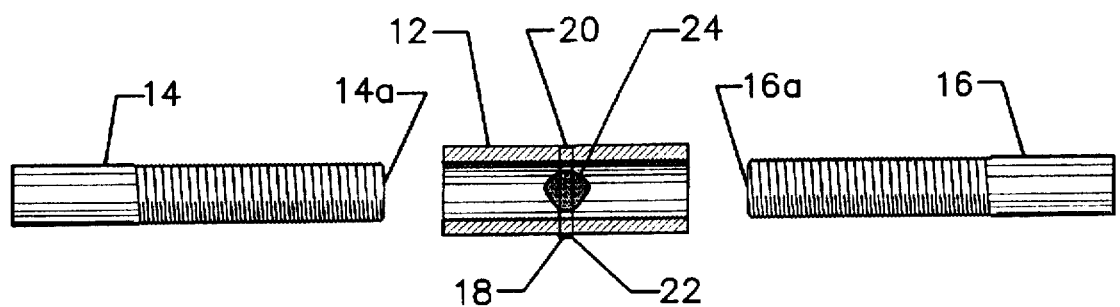
FIG. 2 is a side elevation view of the coupler with engagement indicator of FIG. 1 and also showing two structural parts prior to insertion within the respective open ends of the sleeve coupler.
Figure 3:
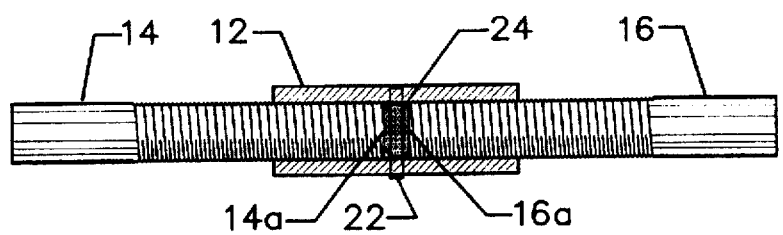
FIG. 3 is a side elevation view similar to FIG. 2 which shows the two structural parts partially engaged within the respective open ends of the sleeve coupler.
Figure 4:
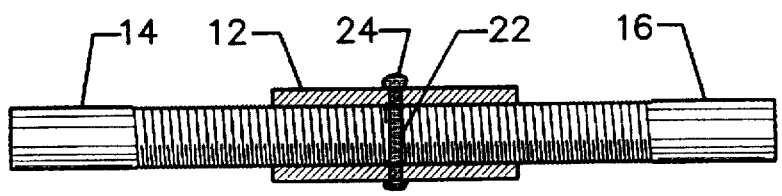
FIG. 4 is another side elevation view similar to FIGS. 2–3 showing the two structural parts fully engaged by the sleeve coupler.

FIGS. 2–4 illustrate how a visual confirmation of proper engagement of two axially aligned structural parts within a single sleeve-type couple is made using the structural tension connector of the present invention. As is best seen in FIG. 2, prior to installation, the two structural parts 14 and 16 are aligned and readied for insertion within the respective open ends of the sleeve 12. At this point, the stop member 22 and the displaceable inspection element 24 are disposed within the sleeve 12 having been inserted within the through-holes 18 and 20.

Upon threaded insertion of the structural parts 14 and 16 within the respective open ends of the sleeve 12, the respective ends 14a and 16a of the structural parts 14 and 16 will first engage the displaceable inspection element 24 and then engage the stop member 22 (see FIG. 3). Continued insertion of the structural parts 14 and 16 within the sleeve 12 causes the displaceable inspection element 24 to be displaced under compressive force outwardly through the through-holes 18 and 20 (see FIG. 4). This process continues until the ends 14a and 16a of the structural parts 14 and 16 firmly abut against the stop member 22. The presence of the displaceable inspection element 24 that is forced out through the through-holes 18 and 20 provides a visual confirmation that a successful coupling with proper engagement has been made.

For most effective results, the displaceable inspection element 24 preferably comprises a material, such as plastic or adhesive, which becomes flowable when subjected to compressive forces.

Further, it is desirable that the displaceable inspection element 24 contain a sufficient quantity of flowable material to ensure that a conspicuous amount will be forced out through the through-holes 18 and 20 for easy visual confirmation that a proper engagement of the structural parts 14 and 16 within the sleeve 12 has been made. It is further desirable that the flowable material used as the displaceable inspection element 24 be incompressible or of low compressibility to ensure efficient displacement of the displaceable inspection element 24 outwardly of the through-holes 18 and 20.

Also, the stop member 22 should not be so thick so as to block passage of the displaceable inspection element 24 out through the through-holes 18 and 20 as the displaceable inspection element is forceably acted upon by the engagement of the respective ends 14a and 16a of the structural parts 14 and 16.

FIGS. 5–8 show several alternate embodiments of the present invention. Elements which are common to the alternate embodiments of FIGS. 5–8 and the embodiment shown in FIGS. 1–4 share similar reference numerals.

FIG. 5 shows a connector 10a constructed in accordance with a first alternate embodiment of the present invention. Like the preferred embodiment described above with reference to FIGS. 1–4, the connector 10a is designed as an internally threaded sleeve 12a and is adapted for receivingly engaging two threaded structural parts (not shown). In this case, only one inspection hole or through-hole 20 is provided in the sleeve wall. Also, the stop member 22a is fashioned as internal ridge or bump that is formed integral along the interior wall of the sleeve 12a adjacent the through-hole 20. As before, the threaded insertion of the structural parts into the respective open ends of the sleeve 12a will engage the displaceable inspection element 24 and forceably cause it to flow out through the through-hole 20 to provide a visual confirmation that a successful coupling has been made.

FIG. 6 shows a single-sided structural connector 10b as a second alternate embodiment of the present invention. The single-sided structural connector 10b includes an internally threaded sleeve 12b which is mated to a base plate 26. The base plate 26 includes holes 28 for receiving mounting hardware, eg., screws, bolt fasteners, nails, etc., for mounting the single-sided structural connector to a wall or other like surface. As before, a pair of co-aligned through-holes 18 and 20 are provided in the sleeve wall adjacent the junction with the base plate 26. The displaceable inspection element 24 is received within the through-holes 18 and 20. The portion 22b of the base plate 26 that defines the junction with the sleeve 12b functions as the stop member for limiting the engagement depth of the structural part (not shown) to be retained by the sleeve 12b.

FIG. 7 shows a structural connector 10c constructed in accordance with a third alternate embodiment of the present invention. In this embodiment, the sleeve 12c is provided with a single through-hole 20. The sleeve 12c is internally threaded throughout its longitudinal length except for a middle portion 22c which forms a stop member for limiting the engagement depth of the inserted structural parts (not shown). As before, the threaded engagement of the structural parts within the respective open ends of the sleeve 12c imparts compressive forces onto the displaceable inspection element causing it to flow out of the through-hole 20 to give a visual indication that a successful coupling has been made. The un-threaded portion or stop member 22c may be formed as an upraised lip member to provide a more pronounced stop element for the inserted structural parts.

FIG. 8 shows a connector 10d constructed in accordance with a fourth alternate embodiment of the present invention. In this embodiment, the connector 10d includes a sleeve 12d having an interior wall surface for swage fit assembly with corresponding structural parts (not shown). As before, the sleeve 12d is provided with co-aligned through-holes 18 and 20 for receiving the stop member 22 and displaceable inspection element 24.

The stop member 24 ensures exact engagement of each structural part within the sleeve 12d and also allows passage of the displaceable inspection element 24 through the through-holes 18 and 20.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A method of coupling two axially aligned structural parts which utilizes a sleeve as a coupling member in a way that permits a visual confirmation that a successful coupling has been made, the method comprising:

forming the sleeve with two opposed open ends, each open end for receivingly engaging a corresponding inserted end of one of the structural parts, the sleeve having a sidewall portion including at least one substantially medially disposed through-hole;

placing a displaceable inspection element within said sleeve adjacent said at least one through-hole in said sidewall portion; and introducing each of the two structural parts to be coupled a predetermined insertion distance within corresponding opposed open ends of the sleeve and into engagement with one another such that abutting ends of the inserted structural parts contact the inspection element and cause the inspection element to extrude from said at least one through-hole for visual confirmation that a coupling of desired penetration depth of each structural part within the sleeve has been successfully made.

2. The method of claim 1, which includes swage fitting the structural parts within the corresponding open ends of the sleeve.

3. The method of claim 1, which includes threadingly engaging the structural parts within the corresponding open ends of the sleeve.

4. The method of claim 1 wherein the displaceable inspection element comprises a material having sufficiently low compressibility that becomes flowable upon application of pressure as applied during an installation of said structural parts within said sleeve.

5. The method of claim 1 which includes providing the sleeve with an internally disposed stop member to limit engagement depth of the structural parts within the respective open ends of the sleeve.

* * * * *